United States Patent [19]

Dismuke

[11] Patent Number: 5,195,778
[45] Date of Patent: Mar. 23, 1993

[54] CAR UTILITY APRON

[76] Inventor: Keith T. Dismuke, 1513 Pearl St., Eldorado, Ill. 62930

[21] Appl. No.: 719,480

[22] Filed: Jun. 24, 1991

[51] Int. Cl.$^5$ .......................................... B60R 11/06
[52] U.S. Cl. ................... 280/770; 280/850; 150/166; 206/373; 296/136
[58] Field of Search ............ 280/153.5, 769, 770, 280/848, 849, 850; 150/166; 206/373; 293/112, 127, 128; 296/136; 191/12 R

[56] References Cited

U.S. PATENT DOCUMENTS

| | | | |
|---|---|---|---|
| 1,434,350 | 10/1922 | Collins | 206/373 X |
| 2,119,072 | 5/1938 | Cohen | 280/850 X |
| 2,570,533 | 10/1951 | Elliott | 150/166 |
| 2,666,840 | 1/1954 | Poirier | 150/166 X |
| 2,979,190 | 4/1961 | Daigle | 280/850 X |
| 3,298,712 | 1/1967 | Greenstadt | 150/166 X |
| 3,749,233 | 7/1973 | McCormick, Jr. | 206/373 |
| 4,041,999 | 8/1977 | Miller | 296/136 X |
| 4,531,560 | 7/1985 | Balanky | 296/136 X |
| 4,589,459 | 5/1986 | Lantrip | 150/166 |
| 4,643,471 | 2/1987 | Fishback | 280/770 X |
| 4,682,691 | 7/1987 | Spiering | 206/373 |
| 4,699,192 | 10/1987 | Kamen et al. | 296/136 X |
| 4,715,499 | 12/1987 | Franklin | 206/373 |
| 4,773,535 | 9/1988 | Cook | 206/373 |
| 4,795,207 | 1/1989 | Clarke | 296/136 |
| 4,810,015 | 3/1989 | McNeil | 296/136 X |
| 4,849,272 | 7/1989 | Haney et al. | 280/770 X |
| 5,056,817 | 10/1991 | Fuller | 280/770 |

FOREIGN PATENT DOCUMENTS 83091 2/1954 Norway ............................. 206/373

Primary Examiner—Brian Johnson
Attorney, Agent, or Firm—Don W. Weber

[57] ABSTRACT

A new and unique car utility apron is presented having a soft flexible outer layer with a number of pockets spaced on the two sides of the apron. The front of the apron has the upper half cut out and replaced with webbing so that the radiator can take air in if the engine is running while the apron is in place. One side of the auto apron has an air power connecting hose while the opposite side has an electrical power connecting hose. The auto apron is attached about the engine compartment of a car by hooks at the top and an elastic band and another set of hooks at the bottom. Tools may be placed in the pockets when not in use or in convenient slots near the upper portion of the apron while temporarily not in use. Electrical or air power may be connected through to the engine compartment simply by connecting the appropriate hose or electrical cord at the bottom of the auto apron. When the apron is not in use it may be folded or rolled into a small package to hold the tools. The soft inner lining of the auto apron as well as a foldable inner flap protect the car's surface from scratches as well as grease or dirt from the mechanic's hands or clothes.

5 Claims, 1 Drawing Sheet

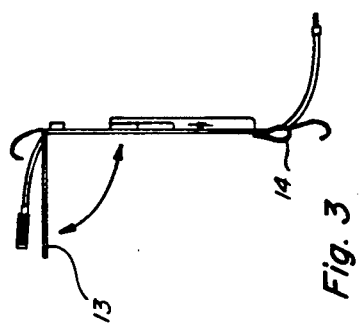
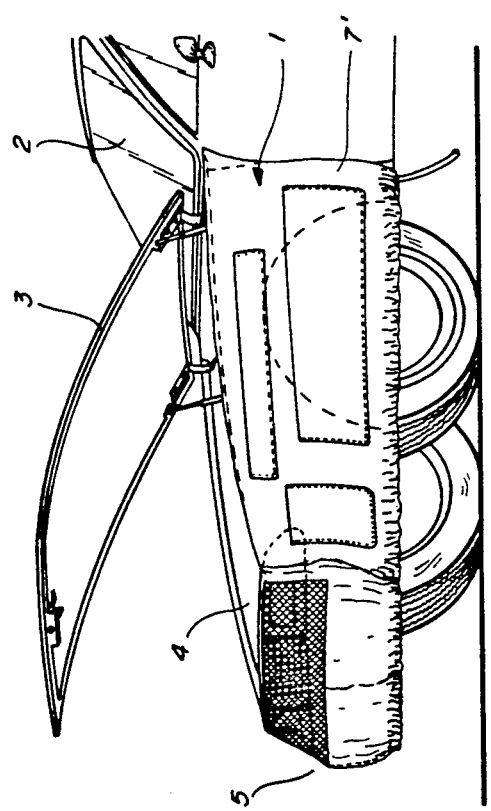
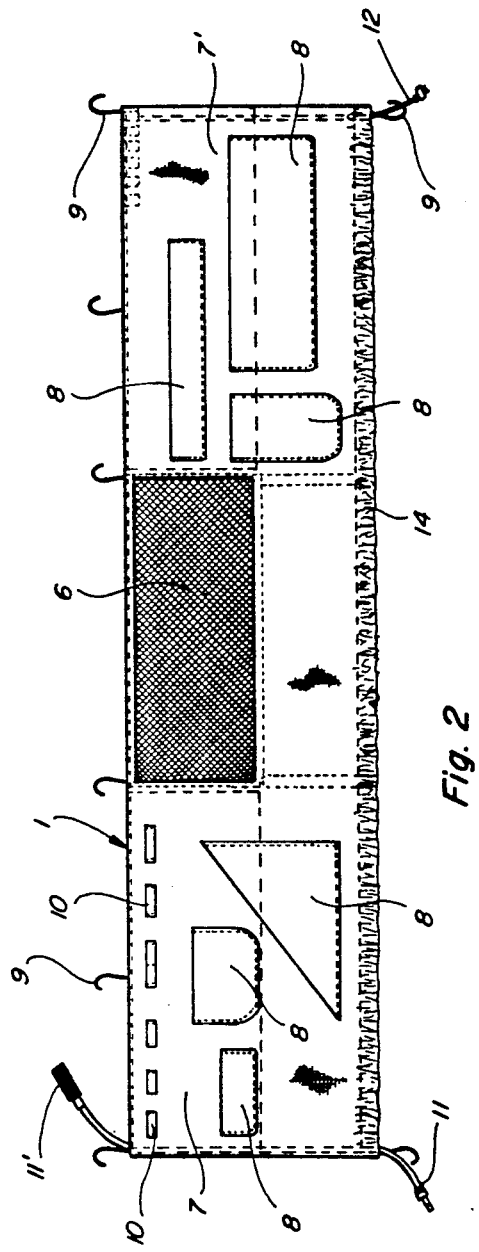

CAR UTILITY APRON

BACKGROUND OF THE INVENTION

This invention relates to the field of auto repair and more particularly to the field of holders and tool caddies for storing tools.

In the auto and truck repair industry it is not uncommon to find different types of tool chests or tool caddies in which the mechanic may place his tools when they are not in use. Tool boxes are commonly known throughout the trade and generally comprise a metal box with a number of drawers. Other advances in the holding of tools have been made with respect to roll-up tool kits such as that patented by Franklin, U.S. Pat. No. 4,715,499 (1987).

One problem with having tools for working on automobiles or trucks is that the tools or the tool chest may often scratch or mar the surface of the automobile while the mechanic is working on repairs. It is also common for the auto mechanic's hands to become dirty with grease or oil and for that substance to be transferred to the hood or sides of the car while the mechanic is working on the vehicle. To remedy the transfer of dirt or grease from the mechanic to the car it has been known in the art to place a cloth or other material over the car in order to prevent this type of damage. Combining the ability of a pouch to hold tools along with the idea of a cloth covering to cover the car's finish is an essence of this invention.

This car utility apron is made for mechanics to make their jobs easier and more efficient. It is an object of this invention to make the accessibility of tools easier for mechanics by having the tools placed in pockets of the car utility apron. It is a further object of this invention to provide a car utility apron which will protect the car finish from scratches or from the receipt of dirt or grease from the mechanic's hands or clothes. It is a further object of this invention to supply an air hose and electrical outlet near the engine compartment rather than near the ground so as to eliminate the hoses and nozzles from coming into contact with the car's finish or surface. Further and other objects of this invention will become obvious upon reading the following Specification.

BRIEF DESCRIPTION OF THE INVENTION

This invention consists of a car utility apron which can be made of flexible vinyl material on the outside but which has a soft cloth material on the inside. The apron is generally shaped to the contours of a car having a side, a front, and a second side. The apron is attached around the two sides and front of an automobile hood by means of hooks or securing straps. An elasticized band at the bottom of the apron helps hold it in place. While the inside of the car utility apron has a soft cloth so as not to mar or damage the surface finish of the vehicle, the side which is then turned outwardly has a number of pockets for placing tools when they are not being used by the mechanic. Additionally, each end of the car utility apron has a power hose for connecting either an air pressure hose or an electrical power hookup. Using these special power hook-ups, a bulky air hose or electrical cord need not be connected in the engine compartment of the car but may be connected close to the ground.

BRIEF DESCRIPTION OF THE DRAWINGS

FIG. 1 is a perspective view showing the car utility apron as it would be in place on an automobile.

FIG. 2 is a front plan view of the car utility apron in its elongated position showing the two sides and front of the apron as well as the various pockets and power connections.

FIG. 3 is a side view of the car utility apron showing the power connection outlet and the inner moveable flap as well as the hooks.

DETAILED DESCRIPTION OF THE PREFERRED EMBODIMENT

The car utility apron 1 is designed to fit around the standard automobile 2 shown on FIG. 1. As is generally the case with most automobiles, the hood 3 may be raised to gain access to the engine compartment 4. The apron is divided up into three main parts, being the front of the apron 5 which has an upper half composed of webbing 6 and two opposite sides 7 and 7'. Each of the sides of the apron has a number of pockets 8. These pockets come in various sizes and shapes in order to accommodate different types of tools. The pockets shown and described on FIG. 2 are meant as an illustration only and not as a limitation as to the precise location and size of the pockets.

The car utility apron 1 is placed about the car as best shown in FIG. 1. The pockets are positioned so that they face outwardly from the engine compartment on the outside of the car. The car utility apron may be conveniently fastened in place about the engine compartment when work is being done on the car by means of a number of hooks 9 which are placed at the top and bottom edges of the apron. An elasticized band 14 along the lower edge of the apron helps keep it in place.

In addition to the pockets, a number of tool slots 10 are also placed on the apron so that tools may be temporarily set in place on the apron while not being of immediate use.

In order to avoid bulky and sometimes abrasive air hoses and nozzles and electrical cords from being draped over the sides of the car, air hose and electrical cord connection positions are also made a part of the car utility apron. As shown on FIGS. 2 and 3, an air hose connection 11 is made in the outer end of the left side of the auto apron so that an air hose may be connected near the ground. The other outlet for the air hose 11' is conveniently placed inside the engine compartment. In the end of the opposite side of the auto apron at its edge is an electrical cord connection 12. This electrical cord connection has its outlet at the top of the auto apron and inside the engine compartment. Its function and method of placement inside the auto apron is identical to that of the air hose.

Turning to FIG. 3, it can be seen that the inner portion of the auto apron has a soft inner flap 13 which folds up or down depending on the application of the particular vehicle.

The car utility apron is form-fitted to the car and attaches with hooks or other means of attachment such as VELCRO strips or tie-ons so as to give maximum protection to the cars and also to make access to a mechanic's tools easier and more efficient. The apron itself may be made of any type of sturdy yet flexible material, with soft, flexible vinyl being preferred. The backside of the material nearest the car is made of a soft substance so as to prevent the car finish from being scratched when the car utility apron is attached to the vehicle. The apron is filled with pockets to hold the tools and accessories and has the above described air hose and electrical outlet connections for easy attachment of these power sources through the apron and hence to the engine compartment. The exact arrangement and number of pockets as well as the type of material and fastening mechanism is meant here as a means of illustration only and not as a limitation.

Once the mechanic is finished with the car utility apron, it is a simple matter to fold the sides on themselves and to either roll the entire apron or fold it into a small and easily transportable size.

Having fully described my invention, I claim:

1. A utility apron for a vehicle, comprising:
   an essentially rectangular flexible cover having two sides, upper and lower edges, a first left section, a center section and a second right section;
   a plurality of tool-receiving pockets spaced on one side of said cover;
   an air hose connector located in the first left section and an electrical connector located in the second right section wherein said connectors are adapted to allow air pressure and electrical current to be connected through said cover;
   a means for attaching said upper edge of the cover to the vehicle and a means for attaching said lower edge of the cover to the vehicle.

2. A utility apron for a vehicle as in claim 1, wherein said flexible cover has a soft lining on one side of the apron whereby said soft lining is placed adjacent to the vehicle.

3. A utility apron for a vehicle as in claim 1 wherein an upper portion of said center section is webbed.

4. A utility apron for a vehicle as in claim 1, wherein said attaching means comprises a plurality of hooks located on the upper and lower edges of said apron.

5. A utility apron for a vehicle as in claim 1, wherein said air hose connector comprises an inlet at the lower edge of said cover, an air hose between said inlet and the upper edge of said cover and an outlet at the upper edge of said cover and wherein said electrical connector comprises an electrical inlet at the lower edge of said cover, an electrical cord between said electrical inlet and the upper edge of said cover and an electrical outlet at the upper edge of said cover, whereby air and electrical power may be attached through said cover from the lower edge thereof to the upper edge thereof.

* * * * *